United States Patent [19]

Akkapeddi et al.

[11] Patent Number: 4,826,955

[45] Date of Patent: May 2, 1989

[54] AMORPHOUS COPOLYAMIDE ARTICLE OF MANUFACTURE WITH MOISTURE-INSENSITIVE OXYGEN BARRIER PROPERTIES

[75] Inventors: Murali K. Akkapeddi, Morris Plains; Jay A. Gervasi, Succusunna, both of N.J.

[73] Assignee: Allied-Signal Inc., Morris Township, Morris County, N.J.

[21] Appl. No.: 146,673

[22] Filed: Jan. 21, 1988

[51] Int. Cl.$^4$ .................. C08G 69/36; C08G 69/26
[52] U.S. Cl. ........................... 528/324; 528/208; 528/347; 528/348
[58] Field of Search .............. 528/324, 347, 348; 428/374.4

[56] References Cited

U.S. PATENT DOCUMENTS

| | | | |
|---|---|---|---|
| 2,252,555 | 4/1939 | Carothers | 528/324 |
| 2,733,230 | 1/1956 | Ufer | 528/324 |
| 2,893,980 | 7/1959 | Ham et al. | 528/324 |
| 3,240,732 | 3/1966 | Ham et al. | 528/324 |
| 3,376,270 | 4/1968 | Ridgway | 260/78 |
| 3,386,964 | 6/1968 | Twilley | 528/324 |
| 3,489,724 | 5/1965 | Iwakura | 528/324 |
| 3,794,625 | 2/1974 | Anderson et al. | 528/324 |
| 3,962,524 | 6/1976 | Miyamoto et al. | 260/37 N |
| 3,968,071 | 7/1976 | Miyamoto et al. | 260/37 N |
| 3,974,234 | 8/1976 | Brinkmann et al. | 525/66 |
| 4,018,746 | 4/1977 | Brinkmann et al. | 260/78 R |
| 4,098,860 | 7/1978 | Etou et al. | 264/171 |
| 4,133,802 | 1/1979 | Hachiboshi et al. | 528/502 |
| 4,232,145 | 11/1980 | Schmid et al. | 528/324 |
| 4,369,305 | 1/1983 | Pagilagan | 528/338 |
| 4,381,371 | 4/1983 | Nielinger | 525/66 |
| 4,398,642 | 8/1983 | Okudaira et al. | 215/1 |
| 4,404,317 | 9/1983 | Epstein | 524/538 |
| 4,442,254 | 4/1984 | Aratani | 524/413 |
| 4,455,417 | 6/1984 | Vanderkoii, Jr. et al. | 528/272 |
| 4,482,695 | 11/1984 | Barbee et al. | 528/208 |
| 4,500,668 | 2/1985 | Shimizu et al. | 524/427 |
| 4,501,879 | 2/1985 | Barbee et al. | 528/288 |
| 4,508,769 | 4/1985 | Vanderkooi, Jr. et al. | 428/36 |

FOREIGN PATENT DOCUMENTS 60-217237 10/1985 Japan.
1250877 10/1971 United Kingdom.

Primary Examiner—Harold D. Anderson
Assistant Examiner—T. Mason
Attorney, Agent, or Firm—Roger H. Criss

[57] ABSTRACT

An article of composition which has a barrier layer of an amorphous nylon copolymer. The copolymer is polymerized from (A) a lactam or aminoalkanoic acid, such as caprolactam, (B) an aralkylene or cycloalkylene diamine, such as m-xylylenediamine, and (C) one or more aromatic diacids, such as isophthalic acid and terephthalic acid. The copolymer barrier layer exhibits excellent oxygen barrier resistance when exposed to moisture.

20 Claims, No Drawings

AMORPHOUS COPOLYAMIDE ARTICLE OF MANUFACTURE WITH MOISTURE-INSENSITIVE OXYGEN BARRIER PROPERTIES

BACKGROUND OF THE INVENTION

1. Field of the Invention

This invention relates to articles of manufacture including a polyamide barrier layer.

2. Description of the Prior Art

There has been an increasing demand for suitable plastic materials to replace glass and metals in the packaging industry, particularly involving food, beverage and pharmaceutical products. However, for such applications, the plastic materials must have, in addition to good processability and mechanical properties, sufficiently high barrier resistant to oxygen, moisture and organic substances (flavor, odor and ingredients), and in the case of carbonated beverages, to carbon dioxide. There are many classes of polymers with specific molecular structures that can achieve good gas barrier resistance to oxygen and carbon dioxide. However, very often materials with good oxygen barrier properties are poor moisture barriers and vice versa, e.g., polar polymers containing hydroxylic groups such as cellophane and polyvinyl alcohol are excellent oxygen barriers but are extremely hygroscopic, and lose their barrier property to a significant extent when wet. Hydrophobic polymers such as polyolefins are good moisture barriers but poor oxygen barriers. Polymers containing a balance of hydrophobic and hydrophilic structures such as ethylene-vinyl alcohol copolymers and nylons (6 and 6,6) have good to excellent barrier properties at low humidity levels but at high humidities become more permeable to oxygen due to the plasticizing action of small amounts of water absorbed. For example, the permeability of nylon 6 to oxygen increases from about 2. cc. mil/100 in.$^2$ 24 hrs. atm. at 0% RH to 15 cc. mil/100 in.$^2$ 24 hrs. atm. at 100% RH. Similarly ethylene-vinyl alcohol shows more than 100 fold increase in permeability to oxygen with humidity, increasing from 0.01–0.06 cc. mil/100 in.$^2$ 24 hrs. atm at 0% RH to 1–2 cc. mil/100 in.$^2$ 24 hrs. atm at 100% RH. While both nylon 6 and ethylene-vinyl alcohol are currently being used in the packaging industry, usually as part of a multi-ply package, due to favorable economics and balance of barrier properties, there is still a need for an article of manufacture including a film barrier layer which would exhibit both excellent oxygen and moisture barrier properties or a moisture-insensitive oxygen barrier characteristic.

SUMMARY OF THE INVENTION

In accordance with this invention, there is provided an article of manufacture comprising a barrier layer formed from an amorphous copolyamide polymerized from:

(A) a polyamide-forming monomer selected from the group consisting of lactams, aminoalkanoic acids and mixtures thereof, the monomer being present in an amount of 0 to about 50 mol percent;

(B) a diamine selected from the group consisting of aralkylene diamines, cycloalkylene diamines and mixtures thereof, the diamine being present in an amount of from about 25 to about 60 mol percent; and (C) at least one aromatic diacid, the diacid being present in an amount of from about 25 to about 60 mol percent, the barrier layer having excellent oxygen barrier resistance when exposed to moisture.

Preferably, the polyamide-forming monomer is caprolactam, the diamine is m-xylylenediamine and the diacid is a mixture of isophthalic acid and terephthalic acid. The resulting amorphous polyamide barrier layer has excellent oxygen permeability resistance when exposed to moisture, such as below about 1, and preferably on the order of about 0.1 to 0.8 cc. mil/100 in.$^2$ 24 hrs. atm. at 100% relative humidity.

It has been discovered that the glass transition temperature of the polyamide copolymer in its wet state (in the presence of water) is a key determining feature for the moisture effects on the oxygen barrier property. Thus, regardless of the crystallinity of the polyamide, the barrier property decreases significantly if the glass transition temperature is greater than or equal to 25° C. when wet. In the present invention, the polyamide copolymer of the film barrier layer is selected such that the dry glass transition temperature is above about 100° C. and the wet glass transition temperature is equal to or greater than about 25° C.

As used herein, the term "$T_g$" means glass-rubber transition temperature as determined by DSC (differential scanning calorimetry) or modulus-temperature profiles in a dynamic mechanical analyzer apparatus. "$T_g$ wet" means the glass transition temperature after the polymer has been completely saturated with water (immersion or 100% RH). "$T_g$ dry" means the glass transition temperature of the copolymer dry as molded or extruded.

The articles of manufacture can be single or multilayered constructions. Such constructions include multilayered film and sheets, blow molded vessels, etc.

DESCRIPTION OF THE PREFERRED EMBODIMENTS

As mentioned above, the copolymer is formed from one or more of (A) polyamide-forming monomers, (B) cyclic diamines and (C) aromatic diacids.

The component (A) is a polyamide-forming monomer selected from the group consisting of lactams, aminoalkanoic acids and mixtures thereof.

Illustrative of these are the $C_5$ to $C_{12}$ lactams and their corresponding aminoalkanoic acids, such as caprolactam, lauryllactam, epsilon-aminocaproic acid, omega-aminolauric acid, 11-aminoundecanoic acid, 12-aminododecanoic acid, aminomethylbenzoic acid, and the like and mixtures thereof. The preferred monomer is caprolactam.

Component B is one or more diamines selected from the group consisting of aralkylene diamines, cycloalkylene diamines and mixtures thereof. These diamines may be substituted with radicals such as halogen. Illustrative of suitable diamines within the context of the invention are m- or p-bis-(aminoalkylbenzenes) such as m- or p-xylylene diamine, or mixtures thereof, m- or p-bis-(aminoethylbenzene), 2,4 bis(aminomethyl) chlorobenzene and the like and mixtures thereof, and cycloalkylene diamines such as bis(p-amino-cyclohexyl) alkanes, in particular bis(p-amino-cyclohexyl) methane, and the like and mixtures thereof. Particularly preferred are m- or p-xylylene diamine (hereinafter sometimes referred to as mXDA and pXDA), bis(p-aminocyclohexyl) methane (hereinafter sometimes referred to as PACM), 1,3-bis-(aminomethyl) cyclohexane, and 1-methyl 2,4-diaminocyclohexane. The preferred diamine is mXDA, which may contain some of the para isomer.

Component C is one or more aromatic diacids, such as aromatic dicarboxylic acids having 7 to 20 carbon atoms, such as terephthalic acid (hereinafter sometimes referred to as TPA), isophthalic acid (hereinafter sometimes referred to as IPA). t-butylisophthalic acid, 3-(4-carboxyphenyl)-1,1,3-trimethyl5-indan carboxylic acid (hereinafter sometimes referred to as PIDA). which is also known as phenylindane dicarboxylic acid, 2,6-naphthalene-dicarboxylic acid, and the like and mixtures thereof. The preferred diacids are mixtures of IPA, TPA and PIDA, most preferably mixtures of IPA and TPA. In the following description and claims, PIDA is sometimes referred to as phenylindane diacid.

Instead of the diacids, the corresponding esters can also be utilized. For example, instead of TPA, diphenyl or dimethyl terephthalate can be employed. Hence. the term "diacid" as used herein is intended to also include such esters.

Component A is present (in approximate mol percents) of from 0 to 50%, preferably about 20 to about 50%, and most preferably about 30 to about 40%. Component B is present in an amount of from about 25 to about 60%, preferably about 30 to about 50%, and most preferably about 30 to about 40 mol percent. Component C is present in an amount of from about 25 to about 60%, preferably about 30 to about 50%, and most preferable about 30 to about 40 mol percent. It is preferred that the molar ratio of component B to component C be about 1:1. It is most preferred that the molar ratio of components A, B and C be about 1:1:1.

If component A is present in an amount greater than about 50 mol percent, the resulting copolymer does not have the desired oxygen barrier resistance when exposed to moisture. This is also the case if components B and C are present in amounts less than about 25 mol percent. If components B or C are present in an amount greater than about 60 mol percent, film-forming polymeric materials are not formed and hence there are no useful barrier properties.

The compositions of the present invention are synthesized by methods generally known in the art for the synthesis of polyamides.

In the case of the copolymers formed from caprolactam, mXDA, IPA and TPA, for example, all of these components can be charged to a reaction vessel, followed by heating to an appropriate temperature (e.g., from about 200 to 325, more preferably about 250 to 300° C.), preferably under a blanket of a non-reactive gas (e.g., nitrogen or argon). Alternatively, the salt of mXDA and IPA/TPA can be formed in situ or added as a preformed salt, followed by the addition of caprolactam. Water may be used as a solvent in the initial stages for the salt formation.

Any type of copolymer is within the contemplation of the present invention, including random copolymers, block copolymers, graft copolymers, and the like.

The copolyamides which form the barrier layer are in general known in the art. These copolymers are described, for example, in Shalaby et al., Journal of Applied Polymer Science, vol. 20, pp. 3185-3196 (1976); U.S. Pat. No. 3,974,234 and British Pat. No. 1,250,877. Also, U.S. Pat. No. 3,386,964 discloses terpolymers of caprolactam, mXDA and a linear aliphatic dicarboxylic acid. However, the prior art has not recognized the improved oxygen barrier properties of these copolymers in the presence of moisture, which makes them highly useful in the articles of manufacture of this invention.

The copolyamides used herein are transparent, amorphous polymers. Their dry $T_g$ is above about 100° C. and their wet $T_g$ is at least 25° C. The copolymers have reduced viscosities (calculated from solution viscosity in m-cresol at 25° C.) of at least about 0.5 dl/g, and preferably about 0.7 to 1.2 dl/g.

Suitable additives, such as dyes, pigments, plasticizers, fillers, antioxidants, stabilizers, etc., may be employed in conventional amounts. If needed, chain extenders, such as polyanhydrides, polyacyllactams, e.g., terephthaloyl-biscaprolactam or terephthaloyl-bislauryllactam, and the like can be added. Also, if needed conventional impact modifiers can be added, such as ethylene-propylene and EPDM rubbers, acrylic rubbers, styrene/butadiene/stryene copolymer rubbers, styrene/ethylene-butylene/styrene copolymer rubbers, and their functionalized derivatives, such as maleated rubbers, etc. Such additives may be added directly to the reaction or may be added to the final copolymer.

The copolyamides described above may be used alone or in combination with other thermoplastic packaging materials.

The copolymers described above may be formed into the articles of the present invention by conventional plastic processing techniques. For example, sheets, films, and other like structures can be formed by well-known extrusion, forming or molding (such as blow molding) techniques.

As used herein, the term "article" is broadly meant to encompass that which is formed, molded, extruded, coextruded, thermoformed, laminated, and the like from the copolyamides and blends with other thermoplastics into any of a variety of sizes, shapes, thicknesses, and so on, whether it be film, sheet containers, bottles, cans, vessels, coextrusions, laminations, multiply construction, and the like.

Film or sheet material made in accordance with the present invention is strong, flexible, and clear. Such materials can be formed into articles such as wrappers, bags, and the like. The copolymers may also be used to form a laminating layer between two or more layers of thermoplastic film or sheet, such as polyethylene, polypropylene, polyesters, polycarbonates, etc. It may be desirable to include a tie layer (e.g., a polyolefin-based tie layer, a polyesteramide tie layer, etc.) between these other thermoplastic layers and the layers of the copolyamides or their blends with other thermoplastics. The compositions described above may also be used for dip coating containers from a polymer solution in order to improve the barrier properties of the package.

As an example of a typical coextruded structure useful for packaging of various products, including food products, a 5-layer coextrusion is employed. This typical construction includes outer and inner layers formed from a polyolefin, such as polypropylene or polyethylene, a central layer which is the barrier film copolymer described herein, and tie layers between the polyolefin layers and the copolymer. The construction of the coextruded article and the number of layes in such construction may vary depending on the application.

Molded containers can be made from the above-described copolymers by compression molding, blow molding, thermoforming, vacuum forming or other such techniques, all of which are well known in the art. For example, blow molded vessels such as bottles and cans can be formed which include film barrier layer of this invention.

Containers may also be formed by coextruding (e.g., in the form of a "tube" or otherwise) a layer of the copolymer together with some other suitable thermoplastic resin. Again, one or more tie layers may be desirable.

Resins which are suitable for blending and forming laminates or coextruded articles in conjunction with the compositions of this invention may include one or more of the following: polyolefins, olefin copolymers, polyesters, polycarbonates and the like. Preferred among these are polyethylene, polypropylene, ethylene vinyl alcohol copolymer, polyethylene terephthalate, and polycarbonates.

The above-described articles of the present invention exhibit low oxygen and carbon dioxide permeability, even when these materials are wet. The oxygen permeability preferably is less than about 1 cc. mil/100 in.$^2$ 24 hrs. atm; and preferably ranges from about 0.1 to about 0.8, when measured as wet (100% RH). The articles also have excellent resistance to water vapor transmission. Typical water vapor transmission rates for the film barrier layers of the present invention are less than about 4 gm. mil/100 in.$^2$, 24 hrs. atm., and generally range from about 2.5 to 3.5. It has been surprisingly found that the oxygen permeability for the film barrier layers of this invention decreases substantially when going from the dry to the wet state.

Articles formed from the compositions of the invention are ideally suited for protecting foodstuffs, medicines, combustibles, and the like substances. They are sterilizable and hot-fillable, as well as being transparent.

The following non-limiting examples are given to further explain the present invention.

EXAMPLES

General Polymerization Procedure for Amorphous Polyamides

In a 500 ml stainless steel resin kettle there was placed 32.21 gm caprolactam, 1.70 gm aminocaproic acid (as an additional optional initiator), 19.92 gm terephthalic acid (TPA), 19.92 gm isophthalic acid (IPA), and 18.48 gm of phenylindane dicarboxylic acid (PIDA).

The kettle bottom was clamped to a glass head which had three openings (ground glass joints). The center joint was fitted with a Teflon bearing and a stainless steel stirrer. One of the side joints contained an inlet tube for inert gas, the outer side joint contained an outlet tube. The solids were swept with argon for 30 min. then 39.53 ml (40.80 gm) of meta-xylylenediamine (mXDA) were added, the sweep contained for 15 minutes before heating. The sweep was also continued throughout the polymerization.

The corresponding molar ratio was caprolactam=1, mXDA=1, TPA=0.4, IPA=0.4 and PIDA=0.2

The kettle was heated startiing at 125° C. The temperature was raised in 25° steps up to 275° C., and the duration of heating was 30 minutes to 2 hours at each temperature except the last. Heating was continued at 275° C. until the reaction mixture became too viscous to stir, or until there was no further change in viscosity. Some formulations were subjected to temperatures up to 330° C.

All of the polymerizations were carried out in the same apparatus and followed the same procedure. The ingredients, and the quantities were varied, as shown in Table I.

The products were transparent, and showed no crystalline melting endotherm in DSC analysis.

Characterization of Products

The products were ground in a Wiley mill and dried overnight at 75° C. under vacuum. They were compression molded into films (nominal thickness of 2 mils) at 250° C. in a 50 ton hydraulic press.

Oxygen permeability tests were run on a Mocon Model DL 200. A special sample holder assembly permitted measurement on a film saturated with moisture, as well as on dry film. Procedures are in ASTM D 3985-81 (dry) and in the Technical note by R. C. Wood (wet). Water vapor transmission was determined in a Blue M instrument according to ASTM E 96 (100° F. and 90% RH).

Glass transition temperatures were determined on a Perkin Elmer DSC 2C. Temperature was raised at 10° C./min from room temperature to 250° C. in a nitrogen atmosphere. If necessary, the sample was quenched at 320°/min, then reheated. For wet $T_g$, film samples were sealed in the sample holder with water, and the $T_g$ was determined in a DuPont 9900 DSC instrument.

Tensile properties were measured on an Instron using micro specimens die cut from 3 to 12 mil film. Specimens were tested dry and saturated by soaking in water.

Solution viscosities were run by conventional methods in m-cresol at 25° C.

Examples 1 to 4

Using the preparation procedure described above, various copolymers were made. Example 1 is a comparative example showing the effect of excess caprolactam. Examples 2-4 are examples of this invention using various amounts of caprolactam, mXDA and diacids. The results are shown in Table 1. In tables, the mol ratios refer to the ratio of the charged monomers.

TABLE 1

| | FORMULATIONS WITH MXDA AND PIDA | | | | | | |
|---|---|---|---|---|---|---|---|
| Example Number | MOL RATIO CL/mXDA/TPA/IPA/PIDA | $n_{sp}/c$ | $T_g$ °C. DRY | WET | O$_2$ PERMEABILITY DRY | WET | WATER VAPOR TRANSMISSION |
| 1 | 3/0.5/0.2/0.2/0.1 | 1.02 | 60 | — | — | 37.5 | — |
| 2 | 1/0.5/0.2/0.2/0.1 | 0.93 | 107 | 2 | — | — | — |
| 3 | 1/1.0/0.4/0.4/0.2 | 0.74 | 141 | 51 | 1.0 | 0.7 | 3.0 |
| 4 | 1/1.5/0.6/0.6/0.3 | 0.15 | 136 | — | — | — | — |

NOTE: CL = caprolactam

Examples 1-3 shows that $T_g$ increases with lower content of caprolactam, and that oxygen permeability was correspondingly reduced. A preferred composition contained 1 mol of caprolactam, 1 mol of diamine and 1 mol of diacids, Example 3.

Examples 5-8

Examples 1-4 were repeated but without PIDA for Examples 5 and 6. Using compositions similar to Example 5 except that no aminocaproic acid was present, larger batches of product were prepared in a 3 liter glass reactor (Example 7) and in a 125 gallon stainless steel vessel (Example 8). The copolyamides of Examples 7 and 8 were extruded into film using a Brabender extruder having a screw diameter of ¾ inch. Typical conditions in the extruder were: zone 1=430° F., zone 2=500° F., zone 3=480° F., at 40 rpm.

The results are shown in Table 2.

TABLE 2

| | FORMULATIONS WITH mXDA AND WITHOUT PIDA | | | | | | |
|---|---|---|---|---|---|---|---|
| Example Number | MOL RATIO CL/mXDA/TPA/IPA | $n_{sp}/c$ | $T_g$ °C. DRY | $T_g$ °C. WET | $O_2$ PERMEABILITY DRY | $O_2$ PERMEABILITY WET | WATER VAPOR TRANSMISSION |
| 5 | 1/1.0/0.5/0.5 | 0.78 | 129 | — | 1.2 | 0.2 | 3.1 |
| 6 | 1/1.1/0.5/0.5 | 1.00 | 123 | 42 | 1.9 | 0.4 | 2.7 |
| 7 | 1/1.0/0.5/0.5 | 0.99 | — | — | 1.1 | 0.8 | 2.9 |
| 8 | 1/1.05/0.5/0.5 | 0.85 | 137 | 54 | 1.1 | 0.1 | — |

Examples 5–8 show that high reduced viscosity, high Tg, and low permeability can be achieved even without the PIDA. Also, film having good barrier properties can be prepared by extrusion or compression molding.

Examples 9–11

In Example 9, the examples were repeated using a single diacid, TPA, and without PIDA. In this example, the mXDA was dissolved in water in the reactor, then TPA was added to form the salt, all at 85° C. Caprolactam was then added, and the mixture polymerized under the normal conditions.

In Example 10, IPA was used and the salt of mXDA and IPA was prepared and isolated by filtration of the cooled aqueous solution. The salt was placed in the reactor along with caprolactam, and polymerized in the normal manner.

In Example 11, caprolactam was not present, and a copolyamide was prepared from equimolar ratios of mXDA and IPA. In this example, the salt was prepared and polymerized in the reactor using the procedure of Example 9.

The results are shown in Table 3.

The examples also show that, if desired, a salt of the diamine and diacid can be preformed, after which the mixture can be polymerized in a normal manner. Also, copolyamides can be prepared without caprolactam.

Examples 13–14

In these examples, multilayered coextrusions were formed. The nylon of Example 9 was first extruded with 1% by weight terephthaloyl-biscaprolactam as chain extender in a Killion extruder, which raised the reduced viscosity from 0.85 to 1.05. On a Killion coextrusion apparatus, this nylon was extruded into a multilayer film die, while simultaneously extruding polypropylene and an adhesive polymer into the same die, using three extruders in all. From the die there emerged a 5 layer sheet of polypropylene/tie layer/nylon/tie layer/polypropylene.

A single grade of polypropylene was used (Rexene 23 S2 from El Paso). In Example 13. the adhesive polymer was Plexar 410 of USI Chemicals. The weight ratio of polypropylene:tie polymer:nylon was 80:10:15. The thickness of the layers was measured as 3.1 mil/ 1.8 mil/ 3.9 mil/ 1.7 mil/ 4.7 mil for polypropylene/ tie/ polyamide/ tie/ polypropylene, with a total thickness of about 15 mils.

In Example 14, Example 13 was repeated except with the base nylon of 0.85 RV. There was no obvious difference from using the two viscosity levels of the copolymer. Layer thicknesses were 4.8 mil/ 1.5 mil/ 2.5 mil/ 1.4 mil/ 5.9 mil, respectively, with a total thickness of about 16 mil.

The sheets of Examples 13 and 14 were boiled in water for over 2 hours, and oxygen permeability was measured as shown in Table 5. It is possible that the polypropylene layers prevented the water from reaching the nylon layer, which could account for the similarity in permeability values between the dry and wet results.

TABLE 3

| | | FORMULATIONS WITH mXDA AND SINGLE DIACID | | | | | |
|---|---|---|---|---|---|---|---|
| Example Number | ACID | MOL RATIO CL/mXDA/ACID | $n_{sp}/c$ | $T_g$ °C. DRY | $T_g$ °C. WET | $O_2$ PERMEABILITY DRY | $O_2$ PERMEABILITY WET | WATER VAPOR TRANSMISSION |
| 9 | TPA | 1/1.0/1.0 | 0.71 | 143 | 53 | 0.2 | 0.4 | — |
| 10 | IPA | 1/1.0/1.0 | 0.61 | 134 | — | — | 0.2 | 2.9 |
| 11 | IPA | 0/1.0/1.0 | 0.67 | 172 | — | 0.5 | 0.1 | — |

Example 12

In this example, a cycloaliphatic diamine was used in place of m-xylylenediamine. The diamine was 1,3-bis-(aminomethyl) cyclohexane. The results are shown in Table 4.

TABLE 5

| Example Number | $O_2$ PERMEABILITY[a] DRY | $O_2$ PERMEABILITY[a] AFTER BOILING IN WATER |
|---|---|---|
| 13 | 0.7 | 0.6 |
| 14 | 0.6 | 0.6 |

[a]permeability normalized for the thickness of the nylon layer only.

TABLE 4

| | FORMULATIONS WITH CYCLOALIPHATIC DIAMINES | | | | | |
|---|---|---|---|---|---|---|
| Example Number | MOL RATIO CL/DIAMINE/TPA/IPA/PIDA | $n_{sp}/c$ | Tg °C. | $O_2$ PERMEABILITY DRY | $O_2$ PERMEABILITY WET | WATER VAPOR TRANSMISSION |
| 12 | 1/1.0/0.5/0.5/0 | 0.80 | 145 | — | — | 2.7 |

As mentioned above, the film barrier layers of the articles of this invention have improved oxygen barrier resistance when measured in the wet state compared to the dry state. This is in contrast to films of caprolactam homopolymers which show a reduced barrier resistance when measured in the wet state compared to the dry state. This is shown in Table 6 below. In addition, comparative properties are given for another amorphous nylon.

TABLE 6

| NYLON | $T_g$ °C. DRY | $T_g$ °C. WET | OXYGEN PERMEABILITY DRY | OXYGEN PERMEABILITY WET | WATER VAPOR TRANS- MISSION |
|---|---|---|---|---|---|
| Example 3 | 141 | 51 | 1.0 | 0.7 | 3.0 |
| Example 9 | 137 | 54 | 1.1 | 0.1 | — |
| A | 41.5 | −13 | 2.5 | 15 | 22 |
| B | 137 | 51 | 2.7 | 1.0 | 3.5 |

Notes to Table 6
Nylon A is a nylon 6 (polycaprolactam), available from Allied-Signal Inc. as CAPRON ® 8207.
Nylon B is an amorphous nylon formed from hexylmethylene diamine and a mixture of TPA and IPA (ratio of 30/70).
It can be seen that the present invention provides an article of manufacture having a film barrier layer exhibiting improved oxygen barrier resistance, even when exposed to moisture.

What is claimed is:

1. An article of manufacture comprising a barrier layer formed from an amorphous copolyamide polymerized from:
   (A) a polyamide-forming monomer selected from the group consisting of lactams, aminoalkanoic acids and mixtures thereof, said monomer being present in an amount of from about 20 to about 50 mol percent;
   (B) a diamaine selected from the group consisting of aralkylene diamines, said diamine being present in an amount of from about 25 to about 60 mol percent; and
   (C) at least one aromatic diacid, said diacid being present in an amount of from about 25 to about 60 mol percent,
said barrier layer having an oxygen permeability when saturated with water of less than about 1 cc. mil/100 in.$^2$ 24 hrs. atm. at 100% RH.

2. The article of manufacture of claim 1, where said polyamide-forming monomer is caprolactam.

3. The article of manufacture of claim 1, wherein said diamine comprises m-xylylenediamine.

4. The article of manufacture of claim 1, wherein said aromatic diacid comprises one or more of terephthalic acid, isophthalic acid or phenylindane diacid.

5. The article of manufacture of claim 4, wherein said aromatic diacid is a mixture of terephthalic acid and isophthalic acid.

6. The article of manufacture of claim 4, wherein said aromatic diacid is a mixture of terephthalic acid, isophthalic acid and phenylindane dicarboxylic acid.

7. The article of manufacture of claim 1, wherein said copolymer is polymerized from caprolactam m-xylylenediamine, terephthalic acid and isophthalic 8. The article of manufacture of claim 7, wherein said polyamide-forming monomer is present in an amount of from about 20 to about 50 mol percent; said diamine is present in an amount of from about 30 to about 50 mol percent, and said aromatic diacid is present in an amount of from about 30 to about 50 mol percent.

9. The article of manufacture of claim 7, wherein said polyamide-forming monomers present in an amount of from about 30 to about 40 mol percent, said diamine is present in an amount of from about 30 to about 40 mol percent, and said aromatic diacid is present in an amount of from about 30 to about 40 mol percent 10. The article of manufacture of claim 1, wherein said polyamide-forming monomer is present in an amount of from about 20 to about 50 mol percent; said diamine is present in an amount of from about 30 to about 50 mol percent, and said aromatic diacid is present in an amount of from about 30 to about 50 mol percent.

11. The article of manufacture of claim 1, wherein said polyamide-forming monomer is present in an amount of from about 30 to about 40 mol percent, said diamine is present in an amount of from about 30 to about 40 mol percent, and said aromatic diacid is present in an amount of from about 30 to about 40 mol percent.

12. The article of manufacture of claim 7, wherein said terephthalic acid and isophthalic acids are present in approximate equimolar amounts.

13. The article of manufacture of claim 11, wherein said barrier layer has an oxygen permeability when saturated with water of from about 0.1 to about 0.8 cc. mil/100 in.$^2$ 24 hrs. atm. at 100% RH.

14. The article of manufacture of claim 1, wherein said article is in the form of a film or sheet.

15. The article of manufacture of claim 14, wherein said film or sheet is a multiply construction.

16. The article of manufacture of claim 1, wherein said article is in the form of a container.

17. The article of manufacture of claim 16, wherein said container is blow-molded.

18. The article of manufacture of claim 17, wherein said container is a bottle.

19. The article of manufacture of claim 1, wherein said article is a coextruded film or sheet, film barrier layer being located in the central portion of said construction.

20. An article of manufacture comprising a barrier layer formed from an amorphous copolyamide polymerized from monomers consisting essentially of:
   (A) a polyamide-forming monomer selected from the group consisting of lactams, aminoalkanoic acids and mixtures thereof, said monomer being present in an amount of from about 20 to about 50 mol percent;
   (B) a diamine selected from the group consisting of aralkylene diamines, said diamine being present in an amount of from about 25 to about 60 mol percent; and
   (C) at least one aromatic diacid, said diacid being present in an amount of from about 25 to about 60 mol percent.
said barrier layer having an oxygen permeability when saturated with water of less than about 1 cc. mil/100 in.$^2$ 24 hrs. atm. at 100% RH.

* * * * *

UNITED STATES PATENT AND TRADEMARK OFFICE
CERTIFICATE OF CORRECTION

PATENT NO. : 4,826,955
DATED : May 2, 1989
INVENTOR(S) : M.K. Akkapeddi et al.

It is certified that error appears in the above-identified patent and that said Letters Patent is hereby corrected as shown below:

Col 3, line 8, "IPA)." should read --IPA),--

Col 3, line 9, "trimethyl5" should read --trimethyl-5--

Col 3, line 10, "PIDA)." should read --PIDA),--

Col 3, line 46, "of the copolymers" should read --of copolymers--

Col 5, line 67, "startiing" should read --starting--

Col 8, line 25, "Example 13." should read --Example 13,--

Col 8, line 28, "ihickness" should read --thickness--

Col 9, line 35, "diamaine" should read --diamine--

Col 9, line 60, "isophthalic" should read --isophthalic acid.--

Col 10, line 60, "percent." should read --percent,--

Signed and Sealed this

Ninth Day of January, 1990

Attest:

JEFFREY M. SAMUELS

Attesting Officer    Acting Commissioner of Patents and Trademarks